(12) United States Patent
Zhou et al.

(10) Patent No.: US 10,613,663 B2
(45) Date of Patent: Apr. 7, 2020

(54) TOUCH PANEL HAVING INSULATION AND LIGHT BLOCKING LAYER ON THE SIDES OF TOUCH ELECTRODES AND MANUFACTURING METHOD THEREOF

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Gang Zhou, Beijing (CN); Xiaofei Yang, Beijing (CN); Dongwang Jia, Beijing (CN); Chuan Wu, Beijing (CN); Tingliang Liu, Beijing (CN); Ni Jiang, Beijing (CN)

(73) Assignees: BOE TECHNOLOGY GROUP CO., LTD., Beijing (CN); Chengdu BOE Optoelectronics Technology Co., Ltd., Chengdu, Sichuan Province (CN)

( * ) Notice: Subject to any disclaimer, the term of this patent is extended or adjusted under 35 U.S.C. 154(b) by 0 days.

(21) Appl. No.: 16/029,514

(22) Filed: Jul. 6, 2018

(65) Prior Publication Data
US 2019/0204966 A1    Jul. 4, 2019

(30) Foreign Application Priority Data

Jan. 3, 2018 (CN) .......................... 2018 1 0004946

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 2203/04103* (2013.01)

(58) Field of Classification Search
CPC .................................................. G06F 3/0412
USPC ......................................................... 345/173
See application file for complete search history.

(56) References Cited

U.S. PATENT DOCUMENTS

2017/0075470 A1* 3/2017 Zhang ..................... G06F 3/044
2017/0192585 A1* 7/2017 Ma .......................... G06F 3/044
2017/0344153 A1* 11/2017 Kim ....................... G06F 3/033

* cited by examiner

*Primary Examiner* — Long D Pham
(74) *Attorney, Agent, or Firm* — Foley & Lardner LLP

(57) ABSTRACT

The present disclosure provides a touch panel and a manufacturing method for the same, and a touch display device. The touch panel includes a substrate, a touch layer and a first insulation and light blocking layer. The touch layer is disposed above the substrate, and includes a touch electrode and an electrode lead wire electrically connected with the touch electrode. The first insulation and light blocking layer are disposed above the touch layer, and are located at sides of the touch electrode and sides of the electrode lead wire.

8 Claims, 2 Drawing Sheets

TOUCH PANEL HAVING INSULATION AND LIGHT BLOCKING LAYER ON THE SIDES OF TOUCH ELECTRODES AND MANUFACTURING METHOD THEREOF

CROSS-REFERENCE TO RELATED APPLICATIONS

This application is based on and claims priority to Chinese Patent Application No. 201810004946.3, filed on Jan. 3, 2018, the entire contents thereof are incorporated herein by reference.

TECHNICAL FIELD

The present disclosure relates to a touch panel and a manufacturing method for the same, and a touch display device.

BACKGROUND

With more mature touch technology, touch-typed display device has been widely used in our daily life. According to difference between different compositional structures, touch panels may be divided into add on mode touch panels, on cell touch panels, and in cell touch panels.

In the related art, a single-layer touch panel structure tends to present shadow elimination when displayed in a dark state.

It should be noted that information disclosed in the foregoing background is only intended to facilitate understanding of the background of the present disclosure, and therefore may include information that does not constitute prior art already known by those skilled in the art.

SUMMARY

According to one aspect of the present disclosure, a touch panel is provided, which includes a substrate, a touch layer disposed above the substrate, the touch layer includes a touch electrode and an electrode lead wire electrically connected with the touch electrode, and a first insulation and light blocking layer disposed above the touch layer, the first insulation and light blocking layer being located at sides of the touch electrode and sides of the electrode lead wire.

In an exemplary arrangement of the present disclosure, the first insulation and light blocking layer covers the entire side of the touch electrode and the entire side of the electrode lead wire.

In an exemplary arrangement of the present disclosure, the touch panel further includes a second insulation and light blocking layer disposed above the touch layer, the second insulation and light blocking layer being distributed on an upper surface of the touch electrode with a predetermined density.

In an exemplary arrangement of the present disclosure, the predetermined density is a density that enables a difference between a first light transmittance of an area where the touch electrode is located and a second light transmittance of an area where the electrode lead wire is located to be less than a critical value.

In an exemplary arrangement of the present disclosure, material of each of the first insulation and light blocking layer and the second insulation and light blocking layer is light-absorption material.

In an exemplary arrangement of the present disclosure, material of each of the first insulation and light blocking layer and the second insulation and light blocking layer is black matrix material.

In an exemplary arrangement of the present disclosure, the touch electrode includes a touch drive electrode and a touch inductive electrode, and the touch drive electrode and the touch inductive electrode are disposed at the same layer.

According to one aspect of the present disclosure, a manufacturing method for a touch panel is provided, which includes forming a touch layer above a substrate, the touch layer includes a touch electrode and an electrode lead wire electrically connected with the touch electrode, and forming a first insulation and light blocking layer above the touch layer and at sides of the touch electrode and the electrode lead wire.

In an exemplary arrangement of the present disclosure, the manufacturing method further includes forming a second insulation and light blocking layer on an upper surface of the touch electrode with a predetermined density.

In an exemplary arrangement of the present disclosure, forming a second insulation and light blocking layer with a predetermined density includes forming a plurality of reference insulation and light blocking layers with different densities on the upper surface of the touch electrode, collecting a first light transmittance of an area where the touch electrode is located and a second light transmittance of an area where the electrode lead wire is located corresponding to reference insulation and light blocking layers with various densities, and selecting the density of the reference insulation and light blocking layer, in which a difference between the first transmittance and the second light transmittance is less than a critical value, from light transmittance data corresponding to reference insulation and light blocking layer with various densities as the predetermined density.

In an exemplary arrangement of the present disclosure, each of the first insulation and light blocking layer and the second insulation and light blocking layer is made from light-absorption material.

According to one aspect of the present disclosure, a touch display device including a touch panel is provided. The touch panel includes a substrate, a touch layer disposed above the substrate, the touch layer includes a touch electrode and an electrode lead wire electrically connected with the touch electrode, and a first insulation and light blocking layer disposed above the touch layer, the first insulation and light blocking layer being located at sides of the touch electrode and the electrode lead wire.

It should be understood that both the foregoing general description and the following detailed description are only exemplary and explanatory, and are not restrictive of the disclosure.

BRIEF DESCRIPTION OF THE DRAWINGS

The accompanying drawings herein are incorporated in and constitute a part of this specification, illustrate arrangements consistent with the present disclosure, and serve to explain principles of the present disclosure together with the description. Obviously, the accompanying drawings in the following description are merely some arrangements of the present disclosure, and those skilled in the art can also obtain other drawings based on these drawings without any creative work.

DETAILED DESCRIPTION

Figure 1:
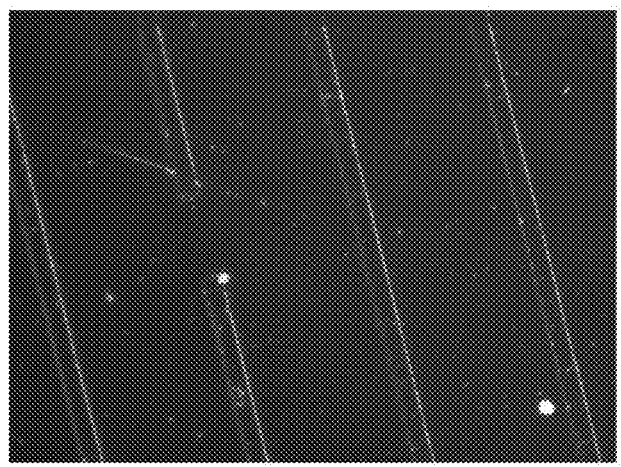
FIG. 1 schematically shows a microscopic view for dark state shadow elimination of the touch panel in a comparative arrangement of the present disclosure.

Example arrangements will now be described more fully with reference to the accompanying drawings. However, example arrangements can be implemented in various forms and should not be construed as limitation to examples set forth herein; features, structures or characteristics described may be combined in one or more arrangements in any suitable manner. In the following description, various specific details are provided to provide a thorough understanding of arrangements of the present disclosure. However, those skilled in the art will recognize that technical solutions of the present disclosure may be practiced while omitting one or more of specific details, or other methods, components, devices, steps, etc. may be used. In other instances, common technical solutions will not be shown or described in detail in order to avoid obscuring various aspects of the present disclosure.

Moreover, these drawings are merely schematic illustrations of the present disclosure and are not necessarily drawn in scale. The thickness and shape of various layers in the drawings do not reflect true scale thereof, and merely intended to facilitate describing contents of the present disclosure. The same numerals in the drawings denote the same or similar parts, and therefore repeated description thereof will be omitted.

In the related art, a single-layer touch panel structure is formed in such a way that a transparent conductive layer is formed on a surface of the substrate, and then a touch layer including a touch electrode and an electrode lead wire is formed by exposure and etching process. The touch layer is composed of a plurality of touch electrodes and electrode lead wires independent from each other. The touch electrode includes a touch drive electrode and a touch inductive electrode. The touch drive electrode and the touch inductive electrode are connected to a drive circuit through electrode lead wires. In the manufacturing method of the touch layer, it is unavoidable that a certain slope is generated at edges of the touch electrode and the electrode lead wire, i.e. a side of the touch electrode and a side of the electrode lead wire are formed as slope surfaces. Slopes of sides of the touch electrode and the electrode lead wire may reflect light, leading to shadow elimination when displayed in a dark state as shown in FIG. 1.

Figure 2:
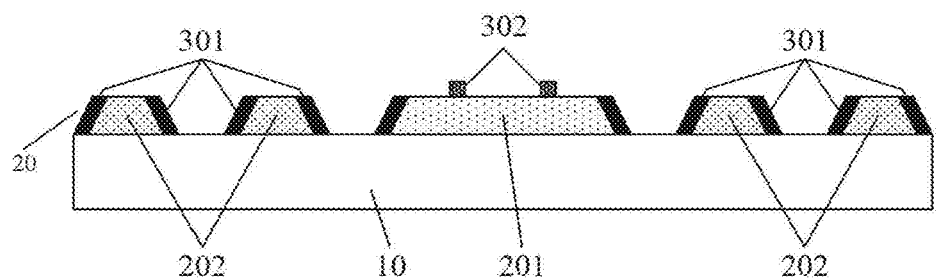
FIG. 2 schematically shows a schematic cross-sectional structural view of the touch panel in an exemplary arrangement of the present disclosure.
Figure 3:
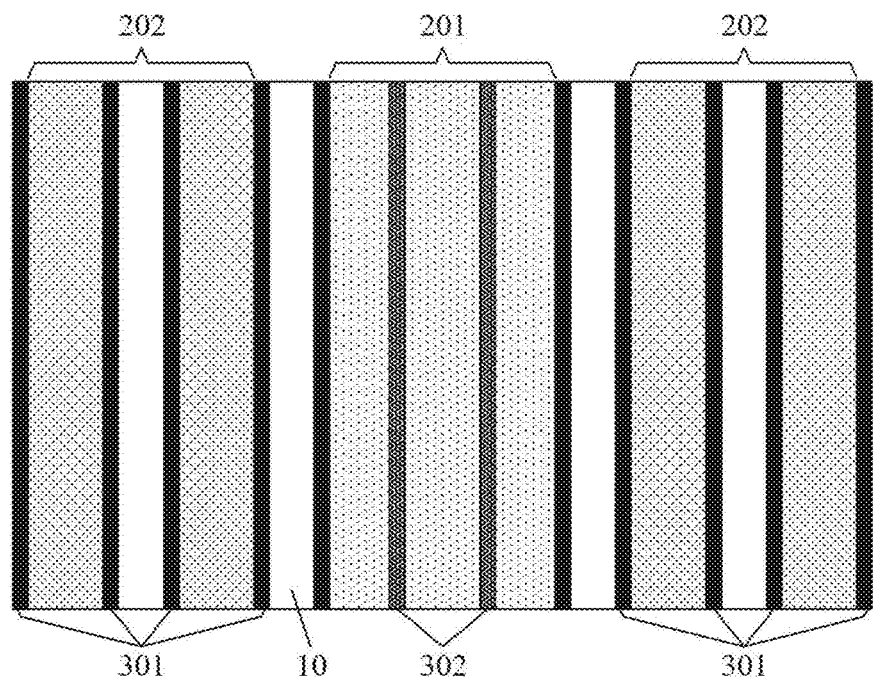
FIG. 3 schematically shows a schematic structural plan view of the touch panel in an exemplary arrangement of the present disclosure.
Figure 4:
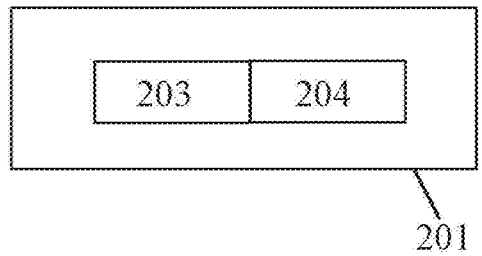
FIG. 4 schematically shows a schematic view of the touch electrode in an exemplary arrangement of the present disclosure.

Based on this, the present arrangement provides a touch panel as shown in FIGS. 2, 3 and 4. The touch panel may include a substrate 10, a touch layer 20 and a first insulation and light blocking layer 301.

The touch layer 20 is disposed above the substrate 10, and may include a touch electrode 201 and an electrode lead wire 202 electrically connected with the touch electrode 201.

The first insulation and light blocking layer 301 is disposed above the touch layer 20, and is located at a side of the touch electrode 201 and a side of the electrode lead wire 202.

The touch electrode 201 may include a touch drive electrode 203 and a touch inductive electrode 204. The touch drive electrode 203 and the touch inductive electrode 204 may be disposed at the same layer or at different layers.

The touch panel provided by an exemplary arrangement of the present disclosure effectively prevents light reflection caused by slope of the side in such a way that the first insulation and light blocking layer 301 are disposed at sides of the touch electrode 201 and the electrode lead wire 202, thereby eliminating an effect of shadow elimination in the dark state, and thus improving display quality of the touch panel.

On this basis, since coverage rate of material of the touch layer in various areas of the screen is different, light transmittances in various areas of the screen are different. Therefore, the overall light transmittance of the touch panel may be uneven, and thus there are bright and dark touch stripes when the touch panel is turned on and displayed, i.e. there is light elimination when the touch panel is displayed in a bright state.

Based on this, with reference to FIGS. 2 and 3, the touch panel may further include a second insulation and light blocking layer 302 disposed above the touch layer 20, the second insulation and light blocking layer 302 being distributed on an surface (such as an upper surface) of the touch electrode 201 with a predetermined density. In the arrangement of the present disclosure, the "density" represents a distribution density of the second insulation and light blocking layer 302, i.e. the number of the second insulation and light blocking layer 302 distributed per unit area. In an arrangement, the "density" may be represented by a percentage between an area of the second insulation and light blocking layer 302 and an area of the touch electrode 201.

The predetermined density refers to a density that enables a difference between a first light transmittance of an area where the touch electrode 201 is located and a second light transmittance of an area where the electrode lead wire 202 is located to be less than a critical value.

It should be noted that the critical value is a threshold for defining difference between the first light transmittance and the second light transmittance, which for example may be set as a small value. A corresponding predetermined density for the critical value may ensure that there is no or small difference between the first light transmittance of the area where the touch electrode 201 is located and the second light transmittance of the area where the electrode lead wire 202 is located.

In this way, the difference between light transmittances of the area where the touch electrode 201 is located and the area where the touch electrode 201 is located may be compensated in such a way that the second insulation and light blocking layer 302 is disposed on the upper surface of the touch electrode 201 in this exemplary arrangement. Further, the overall light transmittances of the touch panel in various areas may also be the same or similar by reasonably designing the density distribution of the second insulation and light blocking layer 302, thereby eliminating an effect of shadow elimination in the dark state, and thus improving display quality of the touch panel.

In the exemplary arrangement, material of the touch layer 20 may be transparent conductive material such as indium tin oxide (ITO), while material of each of the first insulation and light blocking layer 301 and the second insulation and light blocking layer 302 located above the touch layer 20 may be light-absorption material such as black matrix (BM) material, and is not limited thereto.

In the exemplary arrangement, the substrate 10 may be a base substrate of the touch panel, and may also be an array substrate formed with other structures such as thin film transistor (TFT) as an example. It should be noted that, with respect to different types of touch panels, the substrate 10 may be a substrate corresponding to different structures.

Figure 5:
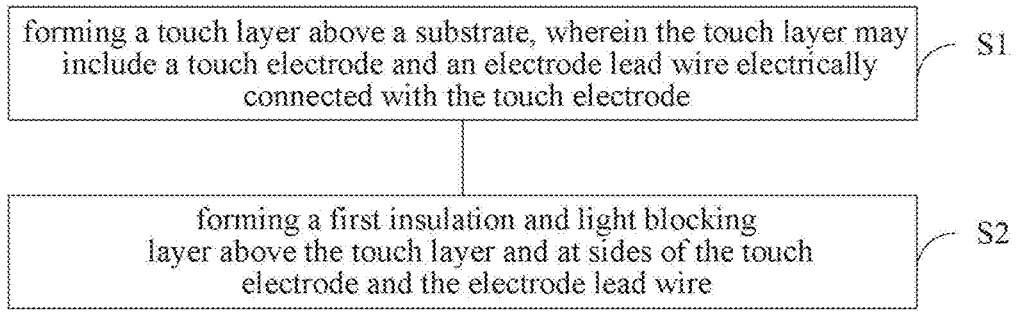
FIG. 5 schematically shows a flowchart of a manufacturing method for the touch panel in an exemplary arrangement of the present disclosure.

Based on the above touch panel, the present exemplary arrangement provides a manufacturing method for a touch panel. As shown in FIG. 5, the manufacturing method for the touch panel may include S1 and S2.

At S1, a touch layer 20 is formed above a substrate 10. The touch layer 20 may include a touch electrode 201 and an electrode lead wire 202 electrically connected with the touch electrode 201.

At S2, a first insulation and light blocking layer 301 are formed above the touch layer 20 and at sides of the touch electrode 201 and the electrode lead wire 202.

The touch electrode 201 may include a touch drive electrode and a touch inductive electrode, and the touch drive electrode and the touch inductive electrode may be disposed at the same layer or at different layers.

The manufacturing method of the touch panel provided by an exemplary arrangement of the present disclosure effectively prevents light reflection caused by slope of the side in such a way that the first insulation and light blocking layer 301 are disposed at sides of the touch electrode 201 and the electrode lead wire 202, thereby eliminating an effect of shadow elimination in the dark state, and thus improving display quality of the touch panel.

Figure 6:
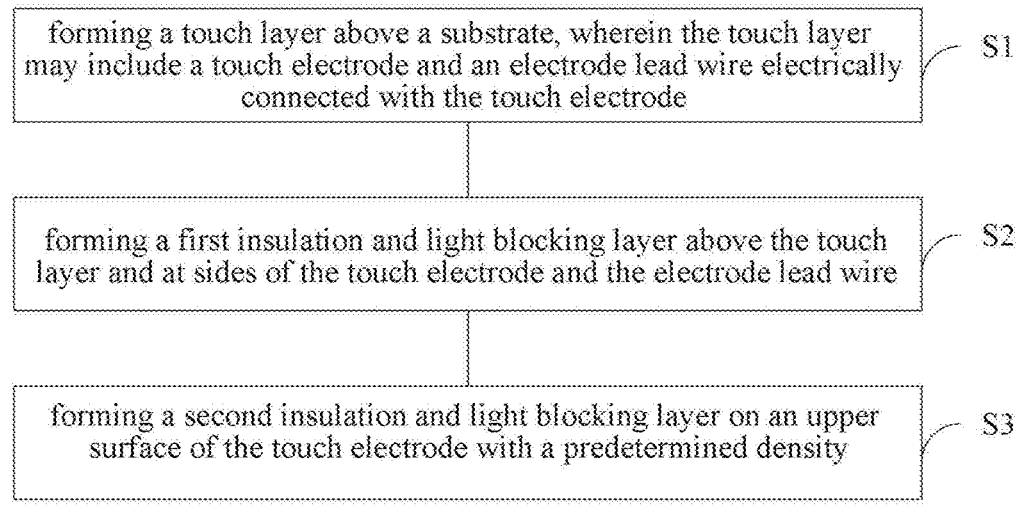
FIG. 6 schematically shows another flowchart of the manufacturing method for the touch panel in an exemplary arrangement of the present disclosure.

On this basis, in order to improve the problem of uneven light transmittance caused by different coverage rate of material of the touch layer in various areas of the screen, as shown in FIG. 6, the manufacturing method (including S1 and S2) for the touch panel may further include S3.

At S3, a second insulation and light blocking layer 302 are formed on an upper surface of the touch electrode 201 with a predetermined density.

The predetermined density refers to a density that enables a difference between a first light transmittance of an area where the touch electrode 201 is located and a second light transmittance of an area where the electrode lead wire 202 is located to be less than a critical value.

Based on this, a method for determining the predetermined density includes S301-S303.

S301 includes a plurality of reference insulation and light blocking layers are formed with different densities on the upper surface of the touch electrode 201;

S302 includes collecting a first light transmittance of an area where the touch electrode 201 is located and a second light transmittance of an area where the electrode lead wire 202 is located corresponding to reference insulation and light blocking layers with various densities; and S303 includes selecting the density of the reference insulation and light blocking layer, in which a difference between the first transmittance and the second light transmittance is less than a critical value, from light transmittance data corresponding to reference insulation and light blocking layer with various densities as the predetermined density.

In this way, the difference between light transmittances of the area where the touch electrode 201 is located and the area where the touch electrode 201 is located may be compensated in such a way that the second insulation and light blocking layer 302 is manufactured on the upper surface of the touch electrode 201 in this exemplary arrangement. Further, the overall light transmittances of the touch panel in various areas may also be the same or similar by reasonably designing the density distribution of the second insulation and light blocking layer 302, thereby eliminating an effect of shadow elimination in the dark state, and thus improving display quality of the touch panel.

Based in the above description, in the manufacturing process of the touch panel, the touch layer 20 may be made of transparent conductive material such as ITO. The first insulation and light blocking layer 301 and the second insulation and light blocking layer 302 may be made of light-absorption material such as BM material.

The present exemplary arrangement provides a touch display device including the touch panel mentioned above. On the one hand, the touch display device prevents light reflection caused by slope of the side in such a way that the first insulation and light blocking layer 301 are disposed at sides of the touch electrode 201 and the electrode lead wire 202, thereby eliminating an effect of shadow elimination in the dark state; while on the other hand, the difference between light transmittances of the area where the touch electrode 201 is located and the area where the touch electrode 201 is located is compensated in such a way that the second insulation and light blocking layer 302 is reasonably disposed on the upper surface of the touch electrode 201, so that the overall light transmittances of the touch panel in various areas may also be the same or similar, thereby eliminating an effect of shadow elimination in the dark state, and thus improving display quality of the touch panel. Based on this, display quality of the touch display device can be significantly improved.

Above all, the touch panel and the manufacturing method thereof, and touch display device provided by the exemplary arrangement of the present disclosure effectively prevents light reflection caused by slope of the side in such a way that the first insulation and light blocking layer are disposed at sides of the touch electrode and the electrode lead wire, thereby eliminating an effect of shadow elimination in the dark state, and thus improving display quality of the touch panel.

It should be noted that the touch panel may be an add-on mode touch panel, or may be an in cell touch panel, which is not specifically limited thereto.

In the exemplary arrangement, the touch display device may include, for example, any product or element having a display function such as a mobile phone, a tablet computer, a television, a laptop, a digital photo frame and a navigator.

Those skilled in the art will readily recognize other arrangements of the disclosed features after considering the specification and practicing the features disclosed herein. This application is intended to cover any variations, uses or adaptations of the disclosed features, and these variations, uses or adaptations follow the general principles of the disclosed features and include any common knowledge or conventional techniques that are not disclosed in the technical field of the disclosed features. The description and examples are to be considered exemplary only, with the true scope and spirit of the disclosure being indicated by the following claims. It should be understood that the present disclosure is not limited to the precise structure that has been described above and shown in the drawings, and various modifications and changes can be made without departing from the scope thereof.

What is claimed is:

1. A touch panel comprising:
   a substrate;
   a touch layer disposed above the substrate, the touch layer comprises a touch electrode and an electrode lead wire electrically connected with the touch electrode;
   a first insulation and light blocking layer disposed above the touch layer, the first insulation and light blocking layer being located at sides of the touch electrode and sides of the electrode lead wire; and
   a second insulation and light blocking layer disposed above the touch layer, the second insulation and light blocking layer being distributed on an upper surface of the touch electrode with a predetermined density, wherein the predetermined density is a density that enables a difference between a first light transmittance of an area where the touch electrode is located and a second light transmittance of an area where the electrode lead wire is located to be less than a critical value.

2. The touch panel according to claim 1, wherein the first insulation and light blocking layer cover an entire side of the touch electrode and an entire side of the electrode lead wire.

3. The touch panel according to claim 1, wherein a material of each of the first insulation and light blocking layer and the second insulation and light blocking layer is a light-absorption material.

4. The touch panel according to claim 1, wherein a material of each of the first insulation and light blocking layer and the second insulation and light blocking layer is a black matrix material.

5. The touch panel according to claim 1, wherein the touch electrode comprises a touch drive electrode and a touch inductive electrode, and the touch drive electrode and the touch inductive electrode are disposed at a same layer.

6. A manufacturing method for a touch panel, comprising:
   forming a touch layer above a substrate, the touch layer comprises a touch electrode and an electrode lead wire electrically connected with the touch electrode;
   forming a first insulation and light blocking layer above the touch layer and at sides of the touch electrode and the electrode lead wire; and
   forming a second insulation and light blocking layer on an upper surface of the touch electrode with a predetermined density, wherein forming the second insulation and light blocking layer with the predetermined density comprises:
   forming a plurality of reference insulation and light blocking layers with different densities on the upper surface of the touch electrode;
   collecting a first light transmittance of an area where the touch electrode is located and a second light transmittance of an area where the electrode lead wire is located corresponding to the plurality of reference insulation and light blocking layers with the different densities; and
   selecting a density of one of the plurality reference insulation and light blocking layers, in which a difference between the first transmittance and the second light transmittance is less than a critical value, from light transmittance data corresponding to the plurality of reference insulation and light blocking layers with the different densities as the predetermined density.

7. The manufacturing method according to claim 6, wherein each of the first insulation and light blocking layer and the second insulation and light blocking layer is made from a light-absorption material.

8. A touch display device, comprising:
   a touch panel, wherein the touch panel comprises:
   a substrate;
   a touch layer disposed above the substrate, the touch layer comprises a touch electrode and an electrode lead wire electrically connected with the touch electrode;
   a first insulation and light blocking layer disposed above the touch layer, the first insulation and light blocking layer being located at sides of the touch electrode and sides of the electrode lead wire; and
   a second insulation and light blocking layer disposed above the touch layer, the second insulation and light blocking layer being distributed on an upper surface of the touch electrode with a predetermined density, wherein the predetermined density is a density that enables a difference between a first light transmittance of an area where the touch electrode is located and a second light transmittance of an area where the electrode lead wire is located to be less than a critical value.

* * * * *